(12) United States Patent
Chang et al.

(10) Patent No.: US 9,377,232 B2
(45) Date of Patent: Jun. 28, 2016

(54) ICE DISPENSER

(71) Applicant: The Coca-Cola Company, Atlanta, GA (US)

(72) Inventors: Franchot Chang, Marietta, GA (US); David Joseph Harvey, Suwanee, GA (US); Arthur G. Rudick, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 18 days.

(21) Appl. No.: 14/319,527

(22) Filed: Jun. 30, 2014

(65) Prior Publication Data
US 2015/0008244 A1    Jan. 8, 2015

Related U.S. Application Data

(60) Provisional application No. 61/842,411, filed on Jul. 3, 2013.

(51) Int. Cl.
*B67D 3/00* (2006.01)
*F25C 5/00* (2006.01)
*B65G 65/40* (2006.01)

(52) U.S. Cl.
CPC .............. *F25C 5/002* (2013.01); *B65G 65/40* (2013.01)

(58) Field of Classification Search
CPC .......... F65C 5/002; F65C 5/005; B65G 65/40
USPC .......... 222/504–509, 146.5, 477, 412, 146.1, 222/146.6; 62/344
See application file for complete search history.

(56) References Cited

U.S. PATENT DOCUMENTS

| | | | | |
|---|---|---|---|---|
| 3,789,620 A | * | 2/1974 | Benasutti | F25D 23/02 222/456 |
| 4,069,545 A | * | 1/1978 | Holet | E05F 3/14 141/362 |
| 4,921,149 A | | 5/1990 | Miller et al. | |
| 5,437,391 A | | 8/1995 | Landers et al. | |
| 5,860,564 A | | 1/1999 | Jablonski | |
| 6,135,173 A | | 10/2000 | Lee et al. | |
| 6,561,691 B1 | * | 5/2003 | McCann | F25C 5/007 366/299 |
| 6,964,351 B2 | | 11/2005 | Jablonski et al. | |
| 8,146,783 B2 | * | 4/2012 | Oh | F25C 5/005 222/146.6 |
| 8,225,960 B2 | | 7/2012 | Njaastad et al. | |
| 2005/0006406 A1 | | 1/2005 | Jablonski et al. | |
| 2006/0169721 A1 | * | 8/2006 | Hammonds | B67D 1/0015 222/146.6 |
| 2013/0306680 A1 | * | 11/2013 | Bamberger | F25C 5/002 222/238 |

FOREIGN PATENT DOCUMENTS

GB   2097772 A   11/1982
WO   2009017285 A1   2/2009

* cited by examiner

*Primary Examiner* — Lien Ngo
(74) *Attorney, Agent, or Firm* — Sutherland Asbill & Brennan LLP

(57) ABSTRACT

An ice dispenser is disclosed herein. The ice dispenser may include an ice chute and an ice gate mechanism positioned about the ice chute. The ice gate mechanism may include a downwardly opening ice gate operated by a pivoting lever system.

19 Claims, 6 Drawing Sheets

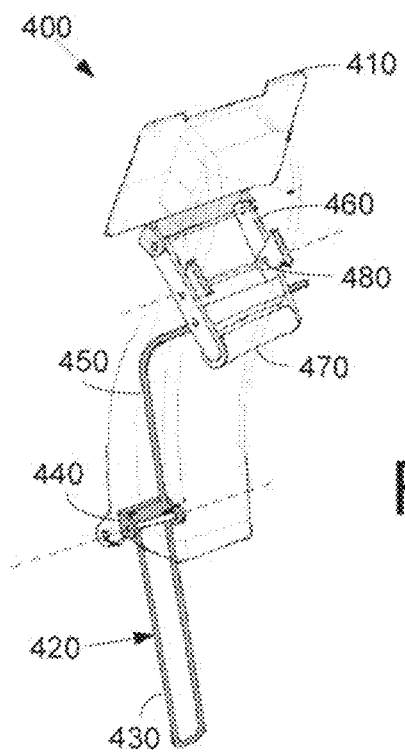
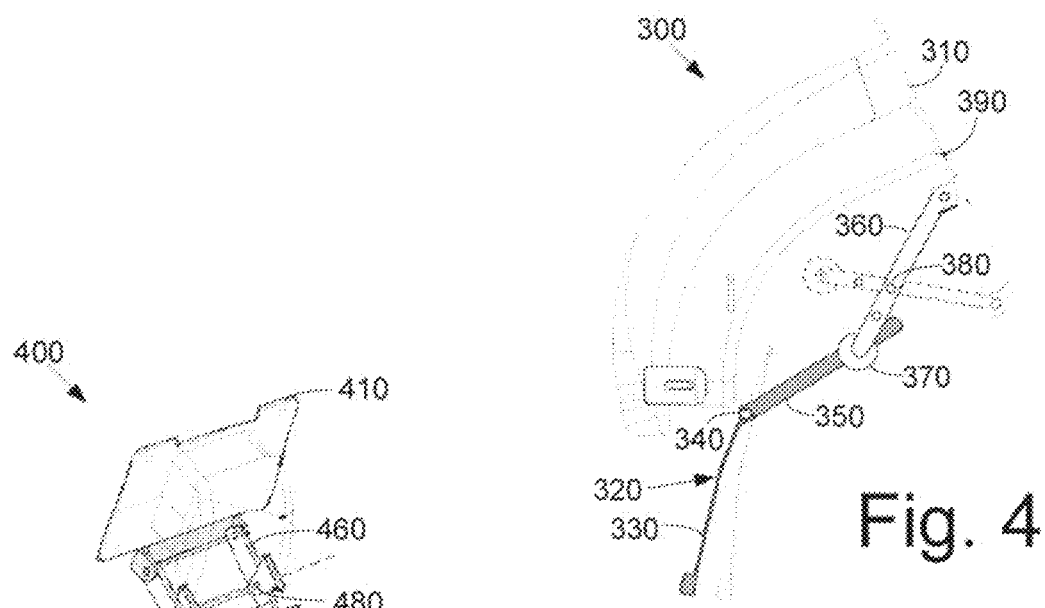
Fig. 4
Fig. 5
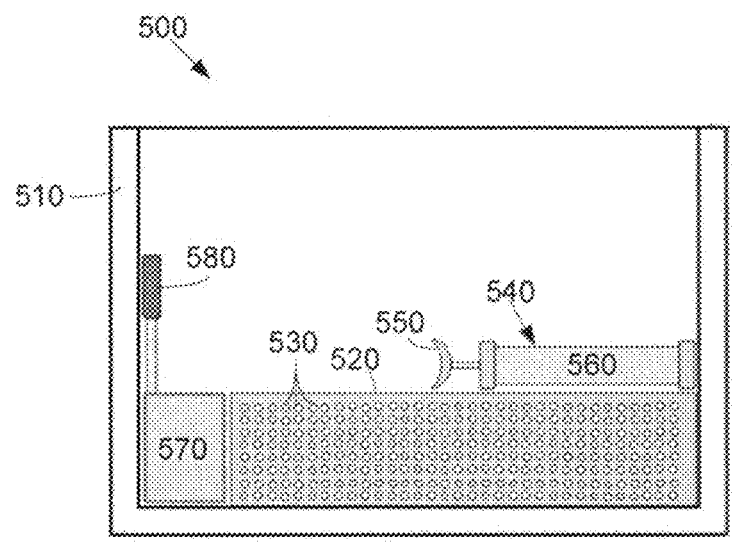
Fig. 6A

ICE DISPENSER

CROSS-REFERENCE TO RELATED APPLICATIONS

The present disclosure claims priority to and the benefit of U.S. Provisional Application No. 61/842,411, filed Jul. 3, 2013, which is hereby incorporated by reference in its entirety.

FIELD

The present disclosure relates generally to an ice dispenser and more particularly relates to a low-cost ice dispenser with an improved ice gate and/or an improved ice agitator for simplified and reliable use with beverage dispensers and the like.

BACKGROUND

The ice dispensing components used with a beverage dispenser and the like may be somewhat complex and expensive. Generally described, an ice hopper containing ice therein may be positioned adjacent to a cold plate or other type of heat transport mechanism so as to chill the beverage concentrate and/or the diluent flowing therethrough. A motor-driven rotary ice agitation system also may be positioned within the ice hopper. The ice agitation system breaks up ice bridges across the cold plate and feeds ice towards an ice gate for dispensing. The ice gate may be operated by large solenoids, pneumatic cyclinders, and the like. Although the use of these electrical components may be well-suited for large volume ice dispensers, the overall costs involved may be prohibitive in the design of a smaller volume dispenser. Moreover, even solenoid or pneumatically operated ice gates may allow a certain amount of "in flight" ice to flow past the ice gate while the gate is in the process of closing.

There is thus a desire for improved ice dispensing components for use with a beverage dispenser and the like. Preferably, these ice dispensing components may efficiently provide the desired amount of ice in a simplified and lower-cost dispensing system.

SUMMARY

Some or all of the above needs and/or problems may be addressed by certain embodiments of the ice dispenser disclosed herein. According to an embodiment, the ice dispenser may include an ice chute and an ice gate mechanism positioned about the ice chute. The ice gate mechanism may include a downwardly opening ice gate operated by a pivoting lever system.

According to another embodiment, the ice gate mechanism may include a first roller arm with a first roller thereon, a second roller arm with a second roller thereon, and an ice gate pivotably attached to the second roller arm. Pivoting the first roller arm in one direction causes the second roller arm to pivot about the first roller and the second roller in a second direction so as to pull the ice gate downward.

In yet another embodiment, the ice dispenser may include a cold plate, an ice hopper positioned about the cold plate, an ice chute positioned about the ice hopper, and an ice agitator operated by a hydraulic piston positioned within the ice hopper.

Other features and aspects of the ice dispenser will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 is a side plan view of an alternative embodiment of an ice gate mechanism as may be described herein.

FIG. 5 is a side perspective view of a further embodiment of an ice gate mechanism as may be described herein.

FIG. 6A is a side plan view of an ice dispenser as may be described herein.

DETAILED DESCRIPTION

Figure 1:
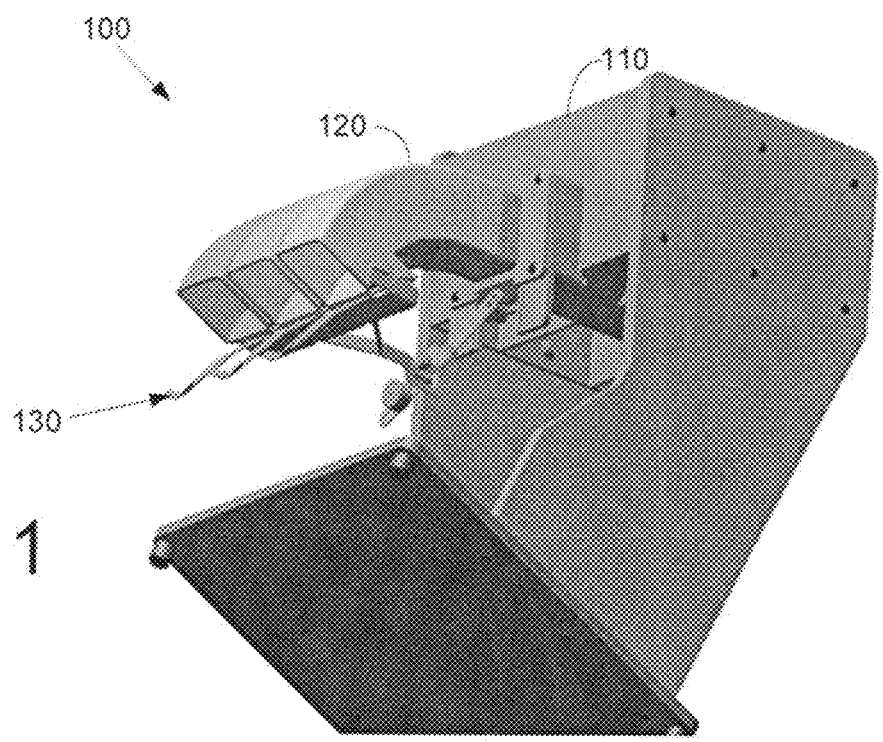
FIG. 1 is a side perspective view of an ice dispenser with an ice gate mechanism as may be described herein with multiple ice dispensing ports superimposed.
Figure 2:
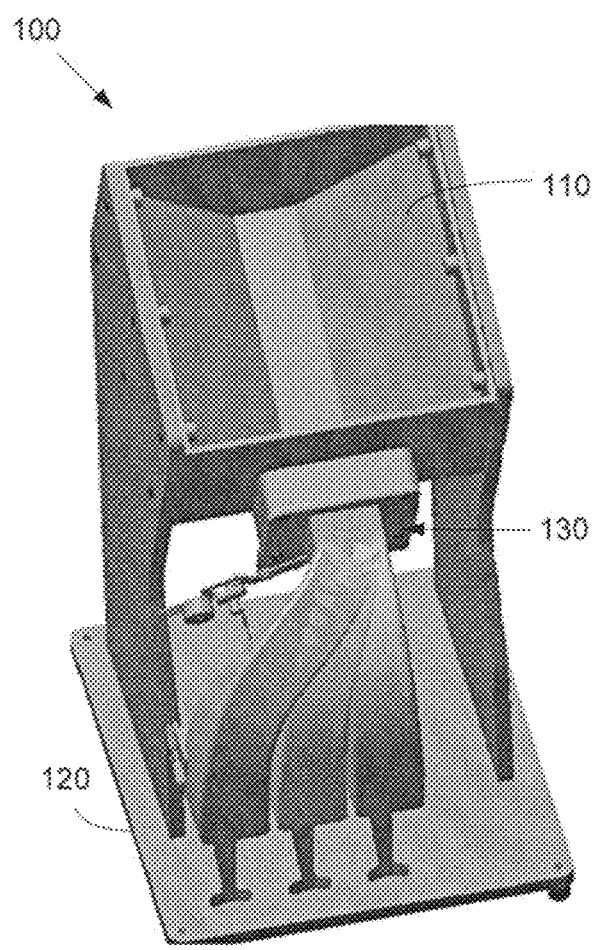
FIG. 2 is a top perspective view of the ice dispenser with the ice gate mechanism of FIG. 1 with multiple ice dispensing ports superimposed.

Described below are embodiments of an ice dispenser (as well as individual components of the ice dispenser). Referring now to the drawings in which like numerals may refer to like elements throughout the several views, FIG. 1 and FIG. 2 show an example of an ice dispenser 100 as may be described herein. The ice dispenser 100 includes an ice hopper 110. The ice hopper 110 may have any size, shape, or configuration. The ice hopper 110 may be insulated in a conventional manner. The ice hopper 110 may be in communication with an ice maker and/or the ice hopper 110 may be manually filled with ice of any type.

The ice hopper 110 may be in communication with an ice chute 120. Three possible locations for the outlet of the ice chute 120 are superimposed in FIGS. 1 and 2. The ice chute 120 may have any size, shape, or configuration. The ice hopper 110 and the ice chute 120 may be in communication via an ice gate mechanism 130. The ice gate mechanism 130 may open and close so as to allow an amount of ice to flow under the force of gravity from the ice hopper 110 into the ice chute 120 and into the consumer's cup and the like. The ice gate mechanism 130 may have any size, shape, or configuration.

Figure 3:
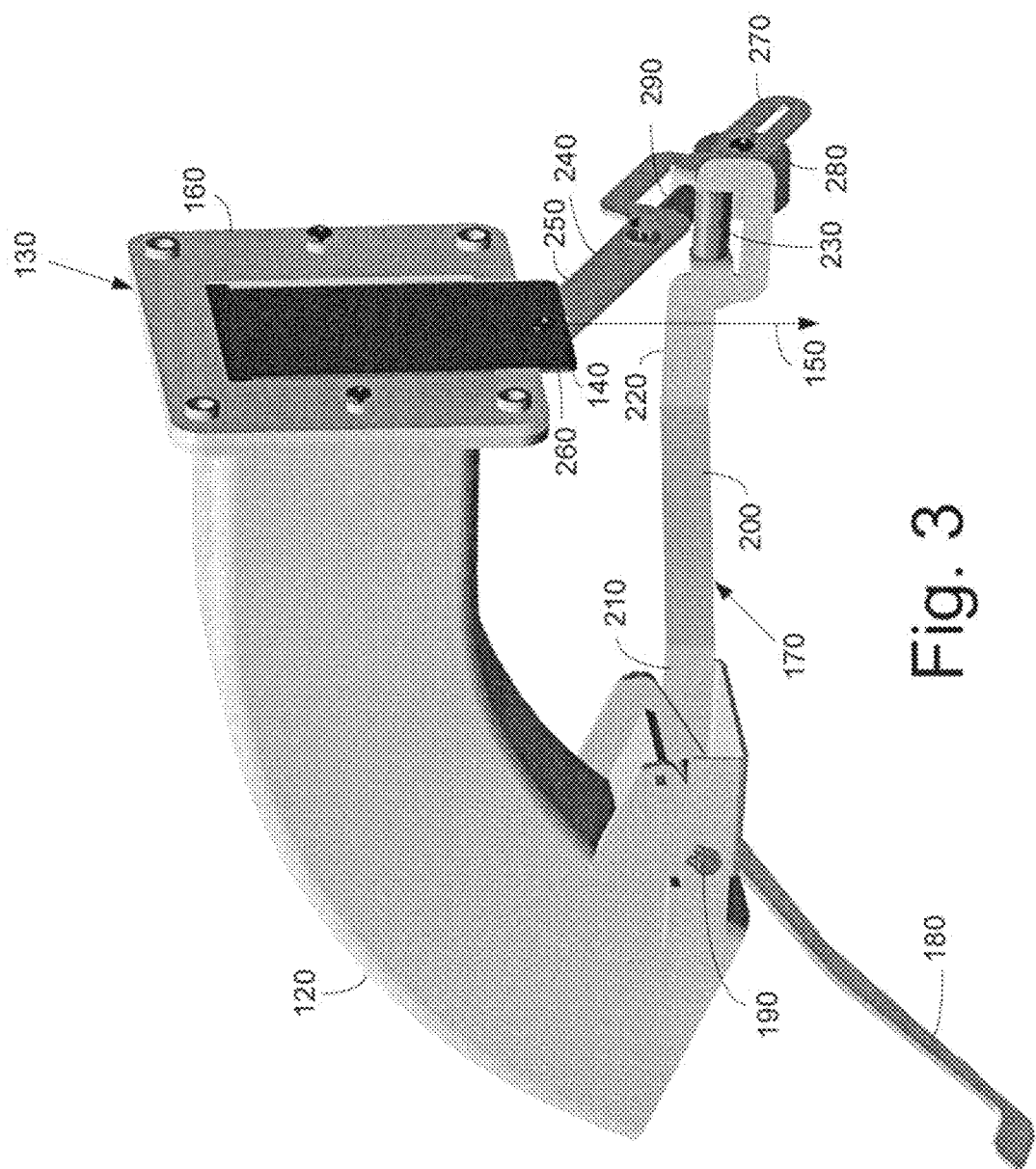
FIG. 3 is a side perspective view of the ice gate mechanism of FIG. 1.

FIG. 3 shows an example of the ice gate mechanism 130 positioned about the ice chute 120. The ice gate mechanism 130 may include an ice gate 140 positioned between the ice hopper 110 and the ice chute 120. In this example, the ice gate 140 may be a downwardly opening ice gate 150. Specifically, the ice gate 150 may open in a downward direction and, hence, closes in an upward direction. By opening and closing in this fashion, the amount of "in flight" ice flow may be reduced. The ice gate 140 may maneuver up and down within an ice gate frame 160. The ice gate 140 may have any size, shape, or configuration. Other components and other configurations may be used herein.

The ice gate mechanism 130 may include a pivoting lever system 170 to open and close the ice gate 140. The pivoting lever system 170 may include a downwardly extending ice lever 180. The ice lever 180 may have any size, shape, or configuration. The ice lever 180 may pivot about the ice chute 120 via a fixed ice lever pivot point 190. The pivoting lever system 170 also may include a first roller arm 200. The first roller arm 200 may be fixably attached to the ice lever 180 such that the ice lever 180 and the first roller arm 200 may pivot about the ice lever pivot point 190. The first roller arm 200 may have any size, shape, or configuration. The first roller arm 200 may have a first roller arm first end 210 positioned about the ice lever pivot point 190 and an opposed first roller arm second end 220. The second end 220 of the first roller arm 200 may have a first roller 230 positioned thereon. The first roller 230 may have any size, shape, or configuration. More than one first roller 230 may be used herein. The axis of the first roller 230 may be substantially parallel to the first roller arm 200.

The pivoting lever system 170 also may include a second roller arm 240. The second roller arm 240 may have any size, shape, or configuration. The second roller 240 may be substantially perpendicular to the first roller arm 200. The second roller arm 240 may include a second roller arm first end 250. The second roller arm first end 250 may be pivotally attached to the ice gate 140 via an ice gate pivot point 260. The second roller arm 240 also may have an opposed second roller arm second end 270. A counterweight 280 may be positioned about the second roller arm second end 270. The counterweight 280 may have any size, shape, or configuration. The second roller arm 240 also may have a second roller 290 positioned adjacent to the counterweight 280. The second roller 290 may be substantially parallel to the second roller arm 240. The second roller 290 may have any size, shape, or configuration suitable to interact with the first roller 230. More than one second roller 290 may be used herein. Other components and other configurations may be used herein.

In use, a consumer may place his or her cup under the ice chute 120 so as to contact the ice lever 180. The ice lever 180 rotates about the ice lever pivot point 190 so as to raise the first roller arm 200. The first roller 230 of the first roller arm 200 contacts the second roller 290 of the second roller arm 240 such that the second end 270 of the second roller arm 240 pivots upward and the first end 250 of the second roller arm 240 pivots downward so as to pull open the ice gate 140. The ice gate 140 drops down so as to allow the free flow of ice from the ice hopper 110 into the ice chute 120. Releasing the ice lever 180 allows the counterweight 280 to pivot downward under the force of gravity such that the second roller arm 240 again raises the ice gate 140 and stops the flow of ice. Because of the downwardly opening ice gate 140, and hence the upwardly closing ice gate, the ice gate 140 stops the flow of ice at the lowest immediate point of contact so as to prevent a flow of "in flight" ice. Other components and other configurations may be used herein.

FIG. 4 shows an alternative embodiment of an ice gate mechanism 300. The ice gate mechanism 300 also includes an ice gate 310. The ice gate 310 also operates in a downwardly opening fashion. The ice gate 310 may be operated by a planar pivoting lever system 320. The planar pivoting lever system 320 includes an ice lever 330. The ice lever 330 may be attached to the ice chute 120 via an ice lever pivot point 340. Likewise, the ice lever 330 may be fixably attached to a first actuator arm 350. The first actuator arm 350 may or may not include a roller such as that described above. The planar pivoting lever system 320 also may include a second actuator arm 360. The second actuator arm 360 may be attached to the ice gate 310 on one end thereof and in a pivoting relationship with the first actuator arm 350 on the other end. The second actuator arm 360 may include a counterweight 370 thereon. The second actuator arm 360 may pivot about a fixed pivot point 380. The second actuator arm 360 also may include a pin 390 sliding about the ice gate 310.

In use, the ice lever 330 may be depressed so as to raise the first actuator arm 350 about the ice lever pivot point 340. Raising the first actuator arm 350 causes the second actuator arm 360 to pivot about the fixed pivot point 380 so as to pull open the ice gate 310 in the downward direction. Releasing the ice lever 330 allows the counterweight 370 to again raise the ice gate 310 so as to stop the flow of ice. The use of the planar pivoting lever system 320 thus reduces the required lateral space for the overall ice gate mechanism 300. Other components and other configurations may be used herein.

FIG. 5 shows an alternative embodiment of an ice gate mechanism 400. The ice gate mechanism 400 includes an ice gate 410. The ice gate 410 also operates in a downwardly opening manner. The ice gate mechanism 400 may include an offset pivoting lever system 420. The offset pivoting lever system 420 may include an ice lever 430. The ice lever 430 may be attached to the ice chute 120 via an ice lever pivot point 440. The offset pivoting lever system 420 includes an offset actuator arm 450. The offset actuator arm 450 may be fixably attached to the ice lever 430 and may pivot about the ice lever pivot point 440. The offset pivoting lever system 420 also may include a pair of second actuator arms 460. The second actuator arms 460 may be attached to the ice gate 410 on one end thereof and may have a counterweight 470 on the opposite end thereof. The second actuator arms 460 may pivot about a fixed pivot point 480. Other components and other configurations may be used herein.

In use, depressing the ice lever 430 causes the offset actuator arm 450 to pivot about the ice lever pivot point 440. The offset actuator arm 450 thus causes the second actuator arms 460 to pivot about the fixed pivot point 480 so as to open the ice gate 410 in the downward direction. Releasing the ice lever 430 allows the counterweight 470 to again pivot the second actuator arms 460 so as to close the ice gate 410. Other components and other configurations may be used herein.

FIG. 6A shows an embodiment of an ice dispenser 500 as may be described herein. In this example, the ice dispenser 500 includes an ice hopper 510. The ice hopper 510 may have any size, shape, or configuration. The ice hopper 510 may be insulated in a conventional manner. In this example, the ice dispenser 500 may be used in conjunction with a cold plate 520 of a beverage dispenser and the like. The cold plate 520 may have a number of coils 530 therein. Diluent, concentrate, and the like may flow through the coils 530 of the cold plate 520 for chilling therein. The cold plate 520 may have any size, shape, or configuration.

Figure 6B:
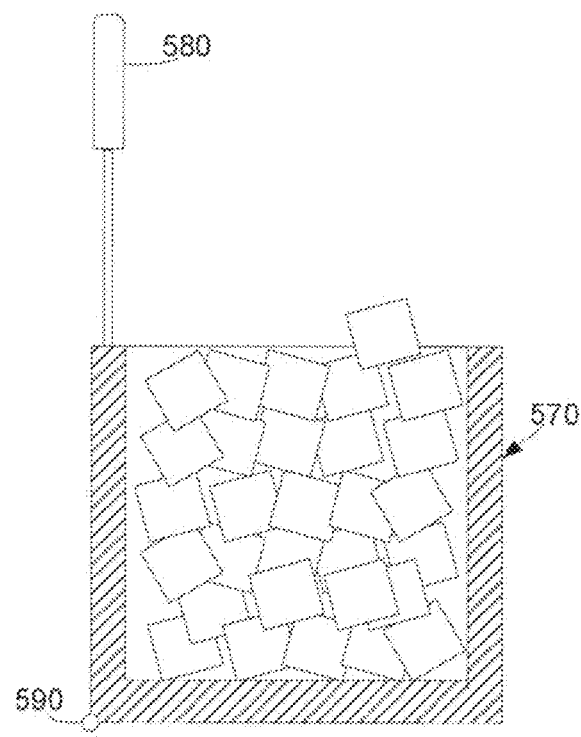
FIG. 6B is a cross-section view of a manually operated tilting bucket as may be used with the ice dispenser of FIG. 6A.
Figure 6C:
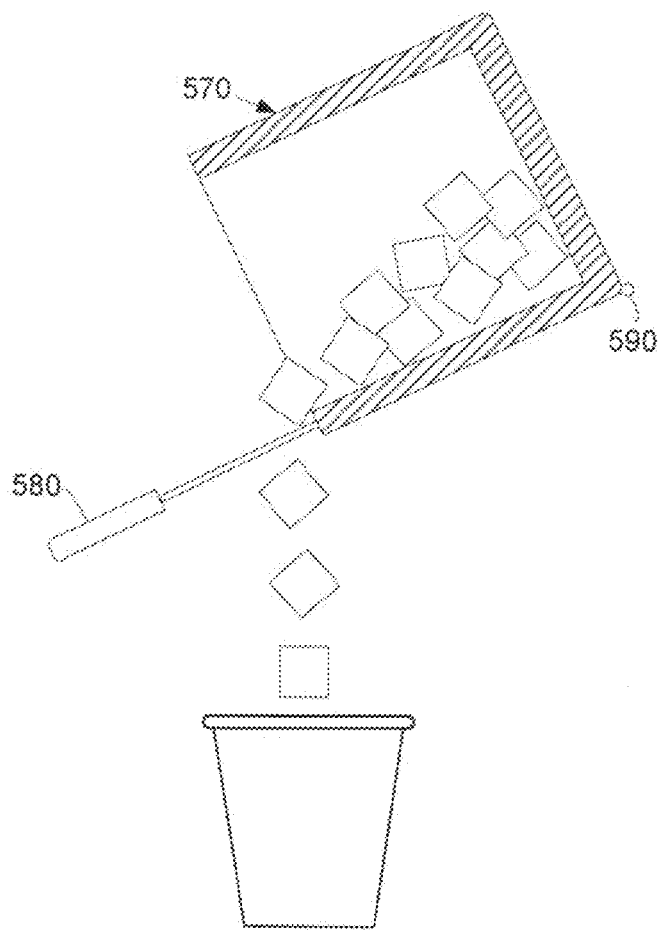
FIG. 6C is a side plan view of the manually operated tilting bucket of FIG. 6B.

As described above, a conventional ice dispenser generally includes a motor-driven rotary ice agitation system to break up ice bridges within the ice hopper 510 and to feed ice towards the ice chute. Instead of such a complex system, the ice dispenser 500 herein may include an ice pusher 540. The ice pusher 540 may be positioned about the cold plate 520 within the ice hopper 510. The ice pusher 540 may include a scraper 550 on one end thereof. The scraper 550 may be maneuvered by a hydraulic piston 560. The hydraulic piston 560 may be operated by any conventional source of carbon dioxide and the like. The ice pusher 540 may have any size, shape, motion, or configuration. The ice pusher 540 may maneuver the scraper 550 along the cold plate 520 in a lateral motion or other type of motion via the hydraulic piston 560. The ice pusher 540 thus prevents the development of ice bridges and may push the ice towards an ice chute. The ice chute may include a manually operated tilting bucket 570. As is shown in FIGS. 6B and 6C, the manually operated tilting bucket 570 may include a handle 580 and may rotate about a pivot 590. The manually operated tilting bucket 570 may have any size, shape, or configuration. Alternatively, the ice chute may be similar to the ice chutes and the ice gate mechanisms described above. Alternatively, the ice chute may include conventional mechanical dispensing systems such as a manually operated gate and/or a manually operated auger and the like. Other components and other configurations may be used herein.

Figure 7:
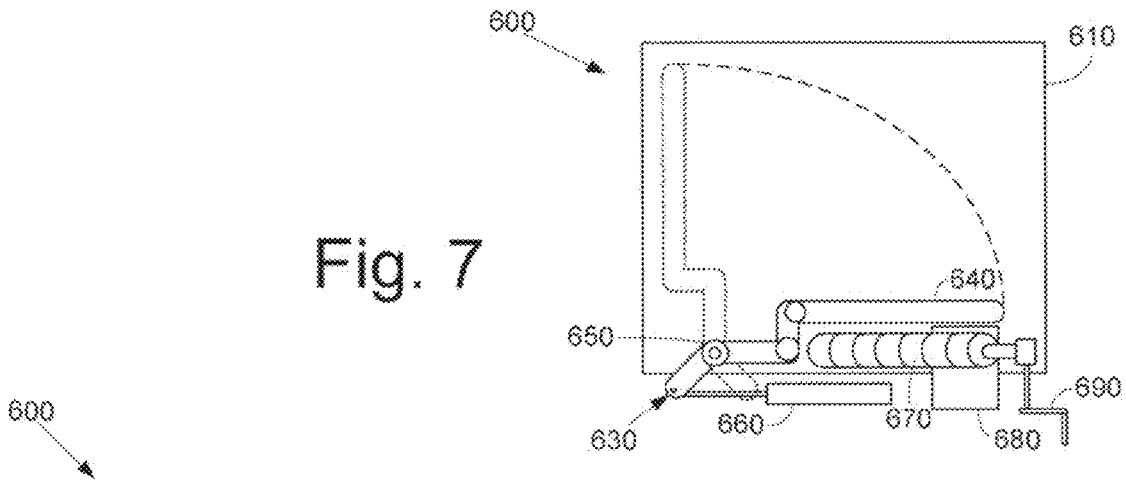
FIG. 7 is a top plan view of an alternative embodiment of an ice dispenser as may be described herein.
Figure 8:
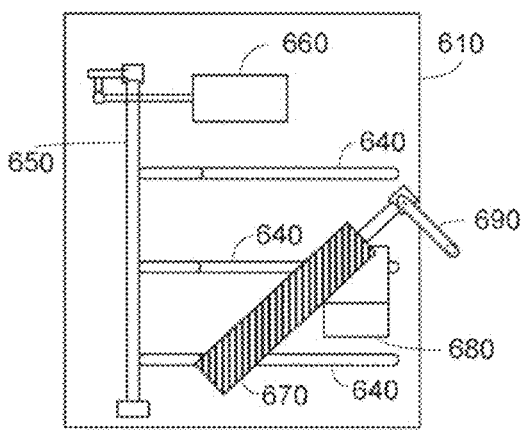
FIG. 8 is a front plan view of the ice dispenser of FIG. 7.
Figure 9:
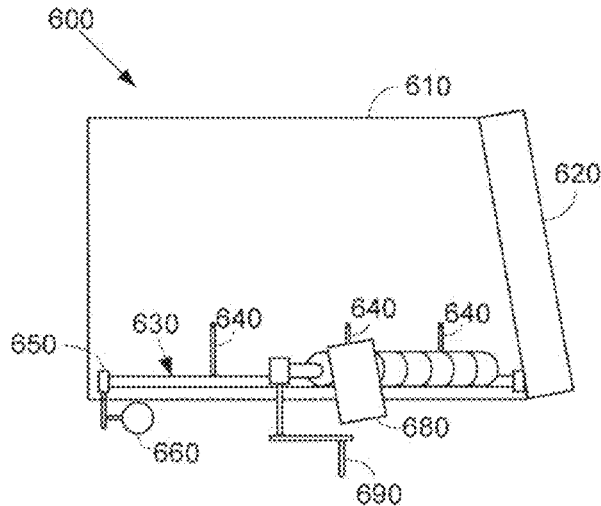
FIG. 9 is a side plan view of the ice dispenser of FIG. 7.

FIGS. 7-9 show a further example of an ice dispenser 600 as may be described herein. The ice dispenser 600 may include an ice hopper 610. The ice hopper 610 may have any size, shape, or configuration. The ice hopper 610 may be insulated in a conventional manner. The ice hopper 610 also may be positioned about a cold plate 620 and the like.

The ice dispenser 600 may include a pivoting agitation system 630. The pivoting agitation system 630 may include a number of ice agitator bars 640. The ice agitator bars 640 may have any size, shape, or configuration. Any number of the ice agitator bars 640 may be used herein. The ice agitator bars 640 may be attached to a pivot rod 650. The pivot rod 650 may be attached to a hydraulic piston 660. The hydraulic piston 660 may operate via any convenient source of carbon dioxide and the like. The hydraulic piston 660 thus causes the ice agitator bar 640 to pivot about the pivot rod 650. This pivoting action serves to break up any ice bridges therein and to direct the ice in any suitable fashion. Other components and other configurations may be used herein.

The ice dispenser 600 also may include an ice auger 670 positioned about an ice chute 680. The ice auger 670 may be manually operated via a crank 690 or other types of mechanical devices and the like. The pivoting agitation system 630 may pivot the ice agitator bars 640 towards the ice auger 670 and the ice chute 680. Likewise, turning the crank 690 causes the ice auger 670 to deliver an amount of ice to the ice chute 680. Other types of ice delivery systems may be used herein. Other components and other configurations may be used herein.

Figure 10:
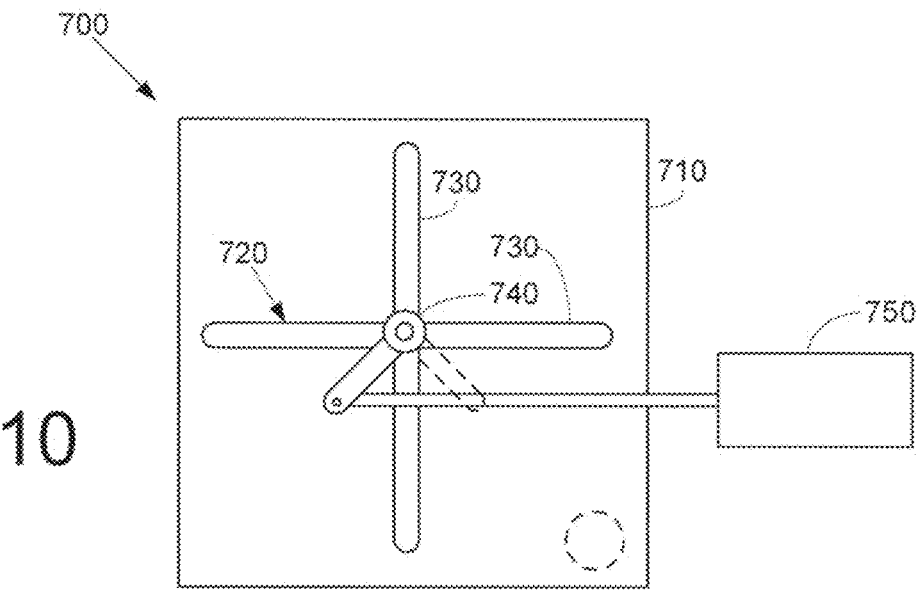
FIG. 10 is a top plan view of an alternative embodiment of an ice dispenser as may be described herein.
Figure 11:
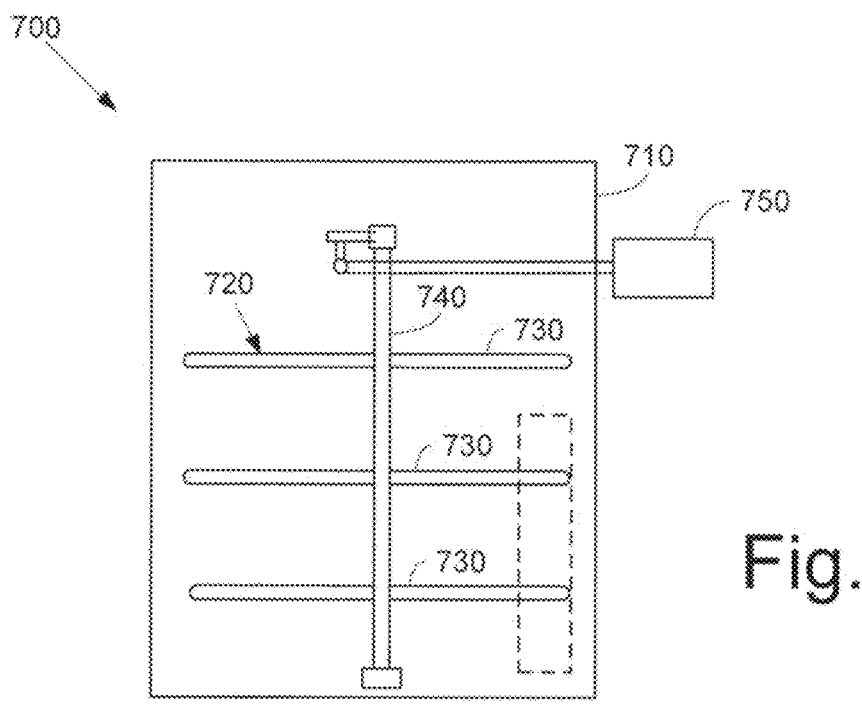
FIG. 11 is a side plan view of the ice dispenser of FIG. 10.

FIGS. 10 and 11 show an alternative embodiment of an ice dispenser 700 as may be described herein. The ice dispenser 700 may include an ice hopper 710. The ice hopper 710 may have any size, shape, or configuration. The ice hopper 710 may be insulated in a conventional fashion. In this example, the ice dispenser 700 may include a center-mounted pivoting agitation system 720. The center-mounted pivoting agitation system 720 may include a number of ice agitator bars 730. The ice agitator bars 730 may have any size, shape, or configuration. Any number of the ice agitator bars 730 may be used herein. The ice agitator bars 730 may be mounted on a center-mounted pivot rod 740. The center-mounted pivot rod 740 may be operated by a hydraulic piston 750. The hydraulic piston 750 may be operated on any convenient source of carbon dioxide and the like. The hydraulic piston 750 maneuvers the center-mounted pivot rod 740 such that the ice agitator bar 730 may pivot about ninety degrees (90°) or otherwise so as to break up ice bridges and direct the ice in any suitable direction. Other components and other configurations may be used herein.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An ice dispenser, comprising:
   an ice chute; and
   an ice gate mechanism positioned about the ice chute, wherein the ice gate mechanism comprises:
      a downwardly opening ice gate; and
      a pivoting lever system in mechanical communication with the downwardly opening ice gate, wherein the pivoting lever system is configured to slide the downwardly opening ice gate between an open position and a closed position.

2. The ice dispenser of claim 1, wherein the pivoting lever system comprises an ice lever attached to an ice lever pivot point.

3. The ice dispenser of claim 2, wherein the pivoting lever system comprises a first roller arm connected to the ice lever.

4. The ice dispenser of claim 3, wherein the first roller arm comprises a first roller thereon.

5. The ice dispenser of claim 3, wherein the pivoting lever system comprises a second roller arm attached to the ice gate and in communication with the first roller arm.

6. The ice dispenser of claim 5, wherein the second roller arm comprises a second roller thereon.

7. The ice dispenser of claim 6, wherein the second roller arm comprises a counterweight thereon, wherein the second roller arm pulls and pushes the ice gate between the open position and the closed position, respectively.

8. The ice dispenser of claim 1, wherein the pivoting lever system comprises a planar pivoting lever system.

9. The ice dispenser of claim 8, wherein the planar pivoting lever system comprises a first actuator arm and a second actuator arm, wherein the second actuator arm pulls and pushes the ice gate between the open position and the closed position, respectively.

10. The ice dispenser of claim 1, wherein the pivoting lever system comprises an offset pivoting lever system.

11. The ice dispenser of claim 10, wherein the offset pivoting lever system comprises an offset actuator arm and a pair of second actuator arms, wherein the pair of second actuator arms pull and push the ice gate between the open position and the closed position, respectively.

12. The ice dispenser of claim 1, further comprising an ice hopper with an ice agitator therein operated by a hydraulic piston.

13. The ice dispenser of claim 12, wherein the ice agitator comprises an ice pusher.

14. The ice dispenser of claim 12, wherein the ice agitator comprises a pivoting agitation system.

15. An ice gate mechanism, comprising:
a first roller arm with a first roller thereon;
a second roller arm with a second roller thereon; and
an ice gate pivotably attached to the second roller arm, wherein pivoting the first roller arm in one direction causes the second roller arm to pivot about the first roller and the second roller in a second direction so as to pull and slide the ice gate downward.

16. An ice dispenser, comprising:
a cold plate;
an ice hopper positioned about the cold plate;
an ice chute positioned about the ice hopper; and
an ice agitator operated by a hydraulic piston positioned within the ice hopper, wherein the ice agitator comprises an ice pusher positioned about the cold plate, wherein the ice pusher comprises a scraper operated by a hydraulic piston, wherein the scraper is disposed along the cold plate.

17. The ice dispenser of claim 16, wherein the ice agitator comprises a pivoting agitation system with one or more agitator bars attached to a pivot rod.

18. The ice dispenser of claim 16, wherein the ice agitator comprises an offset pivoting agitation system.

19. The ice dispenser of claim 16, wherein the ice hopper comprises a manually cranked ice auger therein.

* * * * *